United States Patent [19]
Fukui et al.

[11] Patent Number: 5,569,455
[45] Date of Patent: Oct. 29, 1996

[54] EXHAUST GAS CATALYTIC PURIFIER CONSTRUCTION

[75] Inventors: Isao Fukui, Uji; Masamitsu Takahashi, Hiroshima; Kazunori Ihara, deceased, late of Iwakuni, by Seiko Ihara, executor; Hiroshi Murakami, Hiroshima; Tetsuhiro Tanaka, Hiroshima; Shinobu Miyaura, Hiroshima; Shinichi Kuroda, Ibaraki; Masahiro Hiraishi, Kyoto; Koji Inoue, Ukyo-ku, all of Japan

[73] Assignees: Shimadzu Corporation, Kyoto; Mazda Motor Corporation, Hiroshima, both of Japan

[21] Appl. No.: 367,925

[22] Filed: Jan. 3, 1995

Related U.S. Application Data

[63] Continuation of Ser. No. 73,432, Jun. 9, 1993, abandoned.

[30] Foreign Application Priority Data

Jun. 10, 1992 [JP] Japan ..................... 4-177584
May 24, 1993 [JP] Japan ..................... 5-121027
May 17, 1993 [JP] Japan ..................... 5-139426

[51] Int. Cl.⁶ ........................................ F01N 3/10
[52] U.S. Cl. .................... 422/174; 422/179; 422/180; 422/199; 422/221; 422/222; 60/300
[58] Field of Search ................... 422/171, 173–174, 422/177, 179, 180, 199, 221–222; 60/299, 300; 502/439, 527

[56] References Cited

U.S. PATENT DOCUMENTS

| | | | |
|---|---|---|---|
| 3,581,489 | 6/1971 | Camin | 422/177 |
| 3,768,982 | 10/1973 | Kitzner et al. | 422/174 |
| 3,770,389 | 10/1973 | Kitzner et al. | 422/176 |
| 3,998,758 | 12/1976 | Clyde | 502/307 |
| 4,115,071 | 9/1978 | Masuda et al. | 422/180 |
| 4,278,639 | 7/1981 | Tadokoro et al. | 422/180 |
| 4,318,828 | 3/1982 | Chapman | 502/527 |
| 4,505,726 | 3/1985 | Takeuchi et al. | 422/174 |
| 4,574,459 | 3/1986 | Peters | 29/527.4 |
| 4,686,202 | 8/1987 | Broecker | 502/527 |
| 4,770,948 | 9/1988 | Oikawa et al. | 428/664 |
| 4,829,655 | 5/1989 | Cornelison et al. | 29/527.4 |
| 4,976,929 | 12/1990 | Cornelison et al. | 422/174 |
| 5,063,029 | 11/1991 | Mizuno et al. | 422/174 |
| 5,094,074 | 3/1992 | Nishizawa et al. | 60/300 |

FOREIGN PATENT DOCUMENTS

| | | | |
|---|---|---|---|
| 0149318 | 7/1985 | European Pat. Off. | |
| 0198435 | 10/1986 | European Pat. Off. | |
| 0283910 | 9/1988 | European Pat. Off. | |
| 2316906 | 2/1977 | France | |
| 4017360 | 12/1991 | Germany | 422/174 |
| 2193656 | 2/1988 | United Kingdom | 422/174 |
| WO92/14547 | 9/1992 | WIPO | |

*Primary Examiner*—Robert Warden
*Assistant Examiner*—Hien Tran

[57] ABSTRACT

Method of forming a catalytic bonding layer by chemical vapor deposition (CVD) onto carrier structures including internal combustion engine exhaust system and catalytic converter components, in order to bond a catalyst layer thereto, thereby providing a structure wherein additionally the bonding layer can be energized to promote catalytic conversion-activating preheating of the catalyst. In an electromagnetic induction catalytic preheating system, a ceramic lattice or a metallic network can form the base structure of the catalytic converter, wherein at least the latter is encompassed by an electrical/thermal insulating layer; around either induction coiling is wrapped and secured by a thermally insulating material. Upon engine start, current is electromagnetically induced in the catalytic bonding layer or the metallic network through the induction coiling. Furthermore, the specific heat capacity of the bonding layer is low, and its specific resistance can be predetermined; thus in heating quickly and efficiently, in tandem the catalyst is heated. The catalytic preheating is also made efficient by the insulating properties of the insulating layers.

22 Claims, 15 Drawing Sheets

EXHAUST STREAM →

EXHAUST STREAM →

EXHAUST STREAM →

EXHAUST STREAM →

(a)

(b)

(a)

(b)

(a)

(b)

EXHAUST GAS CATALYTIC PURIFIER CONSTRUCTION

This application is a continuation of application Ser. No. 08/073,432 filed Jun. 9, 1993, now abandoned.

BACKGROUND OF THE INVENTION

1. Technical Field

The present invention relates to fabrication of exhaust gas catalytic conversion systems; more specifically it relates to a structure arising from a particular method of fabrication which enables inductive heating to activate exhaust gas purifying catalyst. The structure is applicable to the catalytic conversion system in connection with an internal combustion engine driven motor vehicle.

2. Description of the Background

Catalytic convertors for vehicles with internal combustion engines are effective to treat noxious components such as HC, CO, and $NO_x$ contained in gases exhausting from the engine by breaking them down into less environmentally contaminating derivatives prior to their exit into the atmosphere.

As regulations imposed on manufacturers governing the levels of such pollutants in vehicle exhaust emission which are permissible have become more and more stringent, the demand for improvements in exhaust gas catalytic purification systems has increased.

One type of such systems incorporates a catalyst applied as a layer onto the surface of exhaust system carrier materials including a catalytic converter support network as well as exhaust conduits. A general manufacturing requirement therein is to form the catalyst layer such that it is not liable to peel away from the base material.

Accordingly, the catalyst layer can be formed on the surface of the catalyst carrier via an intermediate layer. One example is described in Japanese Patent Laid-Open No. 71898/1982, wherein oxide whiskers are grown on the surface of a metallic carrier, composed of a ferric stainless steel alloy containing aluminum, to form a catalytic bonding intermediate layer, onto which a catalyst layer is formed. The bonding layer whiskers superficially formed on the surface of the metallic carrier firmly adhere the catalyst layer. Furthermore, the bonding layer, being superficially formed on the metallic carrier though a chemical reaction therewith, is adhered to it very firmly.

A significant drawback of this method of bonding a catalyst to base material is that it takes a considerable amount of time to form the bonding layer.

Since catalytic materials are effective at the high temperatures of the exhaust gas itself in breaking down the noxious components thereof, purification performance during warm-up to normal operating temperature following engine cold start is poor, and hydrocarbons and other untreated pollutants temporarily are exhausted into the atmosphere. The cumulative effect from the multitude of motor vehicles is significant enough to warrant treatment.

Recent attempts made to enhance the catalytic materials themselves to be effective for exhaust gas purification at the lower temperatures during engine warm-up have met with limited success.

Accordingly, means to accelerate the heating of the exhaust-treating catalyst in advance of engine warm-up have been proposed, as disclosed for example in Japanese Utility Model Application Laid-Open No. 36324/1974, which describes the installation of an electric heater in close proximity to the end of a monolithic-structured catalyst and upstream with respect to exhausting gas flow.

Therein, heat energy produced by electric current through heater wire spaced apart from the catalyst-bearing support heats gas at the mouth of the catalytic converter, and the heated gas in turn heats the catalyst as it enters the monolithic structure. The heated gas superficially contacting the catalyst does not serve as an efficient heat transfer medium to effectively heat the catalyst, since its temperature drops considerably as a consequence of mixing with surrounding gas. The amount of electrical current supplied to the heater necessary to overcome this problem is too great to be practical for apparatus in automobile installations.

Another proposal is in Japanese Utility Model Laid-Open No. 67609/1988. Specifically therein, a conductive metallic base material is used as a catalyst carrier, and the carrier is electrically energized in order to heat the exhaust-purifying catalyst to a high temperature.

This way of preheating the catalyst by electrically energizing the metallic carrier is not satisfactory in that considerable time is taken to heat the metallic carrier to sufficiently high temperature, tending to nullify the purpose of catalytic preheating. Moreover, since a large amount of electricity is drawn from the battery by this preheating system immediately after the engine is started, a heavy burden is imposed on it.

The metal support carrying the catalyst and as such forming a monolithic construction is integral in the electric heating circuit, which is liable to bring about the drawback of localized heating of the support, such that considerable differences in temperature will exist from one portion thereof to another. Consequently, different rates of expansion arise, causing separation of the catalyst material from the support.

Japanese Utility Model Application Laid-Open No. 124412/1974 proposes a monolithic catalyst assembly which comprises a platinum catalyst carried in a monolithic structure on a support of silicon carbide which serves as a heating element, wherein the catalyst may be heated upon application of an electric current to the heating element.

Similarly. Japanese Patent Application Laid-Open No. 295184/1991 proposes a honeycomb-structured support as a catalyst carrier, formed as a product of powder metallurgy, to which an electric current is directly applied in order to heat it.

Wherein the catalyst support of the monolithic construction is designed to function itself as a heating element, it is essential that the support, in composing an electric circuit, have a controlled resistance, whether the support is made of silicon carbide or a metal, or formed from a product of powder metallurgy. This type of construction, however, not only adds to the cost of the catalytic purifier apparatus, but also presents a problem in reliability, since an undesirable change in resistance is likely to occur during cycles of actual operation as a result of, for example, the separation of metal-to-metal joints wherein the support is formed from a metal foil, or as a result of partial cracking of a sintered support. Moreover, production of a reliable and satisfactory catalytic purifier construction is hindered by the difficulty of adequately forming electrode portions on the foregoing support.

SUMMARY OF THE INVENTION

Among the advantages sought is a method of forming exhaust gas converting catalyst onto carrier base material, so as to eliminate peeling away of the catalyst despite prolonged use.

It is additionally sought to realize the bonding of catalyst to catalytic converter catalyst support materials which would otherwise be deformed by the heat required by conventional bonding methods in a monolithic construction; and to realize the bonding of catalyst to the bore of exhaust conduits to provide auxiliary catalytic conversion along the course of the exhaust system as well.

A further advantage sought is the rapid heating of the conversion catalyst in advance of heating of the exhaust system components by the exhausting gases as the engine warms up to operating temperature.

Further it is desirable to improve the efficiency of preheating of catalytic conversion components, keeping draining load on the engine ignition system battery to a minimum.

Accordingly, the present invention relates to a method of bonding a catalyst for exhaust gas purifying catalytic conversion to both metallic and lithic substrates, in the exhaust system of internal combustion engine motor vehicles. The method comprises the inventive step of forming a catalyst bonding layer by chemical vapor deposition, which can be carried out at temperatures on the order of those developed by the exhausting gas during operation, such that bonding of strength comparable to higher-temperature methods can be effected on carrier materials which otherwise might become deformed by higher temperature bonding heat.

The invention also relates to rapid, efficient; preheating of the catalyst as a measure against further reduction of noxious vehicle emissions to comply with or exceed increasingly stringent government regulations, yet at the same time minimizing power drain on the motor vehicle engine battery used to supply the catalyst preheating energy.

Furthermore the invention can provide electromagnetic inductive heating of the inventive catalyst bonding layer to heat at vehicle start-up the catalyst of a catalytic converter included in the exhaust system, with maximum speed and minimum battery drain.

Therein, if the catalyst is carried on a ceramic support lattice integral with an encompassing electrically and thermally insulating layer, inductive heating is yet more efficient, since the insulating material contains the heat of the catalyst electromagnetically induced therethrough.

Thus inductive heating realizes advantages of efficiency and stability, since the resistance or resistivity of the heated element, in being heated uniformly, remains consistent in that problems due to mechanical connections are eliminated. Moreover, inductive heating ensures that engine ignition battery power is used most conservatively.

An exhaust gas catalytic purifier construction in one aspect of the present invention comprises a ceramic honeycomb-structured catalyst carrier to which a catalyst is adhered via a bonding layer, which may be electrically conductive, formed onto the ceramic carrier by chemical vapor deposition. An electrically and thermally insulating layer is formed peripherally on the catalyst carrier, thereby composing a monolithic catalytic converter base construction. Further, an induction heating coil may be wound onto the catalytic converter insulating layer, and the coil may be fixed in the construction by a heat-resistant layer of ceramic or the like material spray-coated or fired on to encompass the monolithic construction.

An exhaust gas catalytic purifier construction in another aspect of the present invention teaches the inductive heating of a catalytic converter which comprises either a metallic catalyst carrier, itself induced, via an heating induction coil peripherally surrounding the carrier and separated from it by an insulating layer, to heat the catalyst, or a ceramic carrier, in which a heating current is induced via an induction coil.

In a further aspect, an exhaust gas catalytic purifier construction is divided into a main catalytic converter portion comprising the ceramic honeycomb-structured catalyst carrier to which catalyst is adhered via the CVD-deposited bonding layer, and an inductively heating sub-portion, having a metallic support carrying catalyst either via the CVD-deposited bonding layer, or by conventional means, of size to heat sufficient catalyst to effect exhaust-fume purifying catalytic conversion in accordance with lower engine speeds during warm-up, for maximum efficiency both in catalytic conversion effectiveness and in battery power use.

Alternatively, the sub-portion can comprise a ceramic catalyst carrier bearing an electrically conductive layer partially formed on the carrier by, for example, chemical vapor deposition, so as to have a predetermined resistance. Current can be applied directly to, or induced in, the conductive layer in order to heat the catalyst. Also, the sub-portion can be heated directly wherein the catalyst carrier is the metallic support.

Yet a further aspect of the present invention defines a method to achieve an exhaust gas catalytic purifier construction wherein a catalytic bonding layer is superficially formed by chemical vapor deposition onto base material comprising components of an engine exhaust system. Therein, the bonding layer consists of either a ceramic or an intermetallic compound of columnar-shaped or gross-structured crystals; and a catalyst layer is superficially formed onto the bonding layer.

In still another aspect of the present invention a catalytic bonding layer is deposited by chemical vapor deposition to the metallic exhaust conduit of an internal combustion motor vehicle exhaust system to effect catalytic conversion exhaust gas purification therein. The catalyst can be heated by means auxiliary to the heating due to the exhausting gases of combustion; for example by applying an electric current directly to the bonding layer, which will be metallic. In this case, an insulating layer is initially applied by chemical vapor deposition to the bore of the exhaust conduit, and then the bonding layer is deposited onto the insulating layer.

The foregoing and other objects and advantages will be more fully apparent from the following detailed description, which, together with the drawings, is illustrative of a preferred and other embodiments of the present invention, without intending to be restrictive of such modifications as might become apparent to persons skilled in this art.

DETAILED DESCRIPTION OF PREFERRED EMBODIMENTS

Figure 1A:
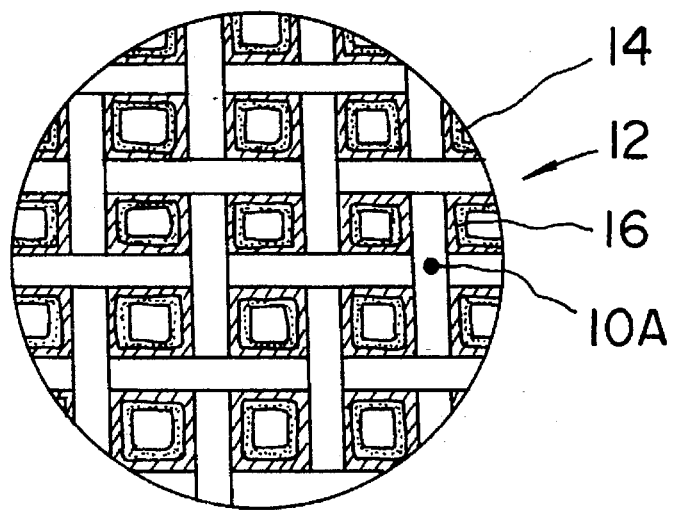
FIG. 1(a) is a magnified elevational view of a catalyst-carrying metallic support network of an exhaust gas catalytic purifier construction.
Figure 1B:
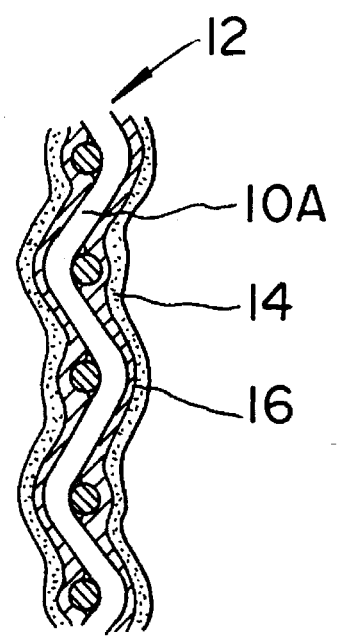
FIG. 1(b) is a partly in sectional view corresponding to FIG. 1(a)

FIG. 1(a), a magnified view seen in the direction of exhaust gas flow, and FIG. 1(b), a cross-sectional partial view thereof, illustrate a catalyst carrier support network in an exhaust gas catalytic purifier construction according to an aspect of the invention, consisting of metallic thin wires 10A, which are woven vertically and horizontally into mesh sheets 12 further tiered in the exhaust gas flow direction.

A bonding layer 14 of columnar-shaped or gross-structured crystals, having a thickness of hundreds to thousands of microns is formed from a ceramic, or from an intermetallic compound, by low-pressure thermal CVD on the surface of the metallic thin wires 10A. The ceramic or intermetallic compound can be tungsten carbide (WC), molybdenum carbide ($Mo_2C$), silicon carbide (SiC), or alloys thereof; or tungsten silicide ($WSi_x$), molybdenum silicide ($MoSi_x$), tantalum silicide ($TaSi_x$), titanium silicide ($TiSi_x$), or alloys thereof.

A catalyst layer 16 is coated on the surface of the bonding layer 14 by a well-known method.

Figure 2:
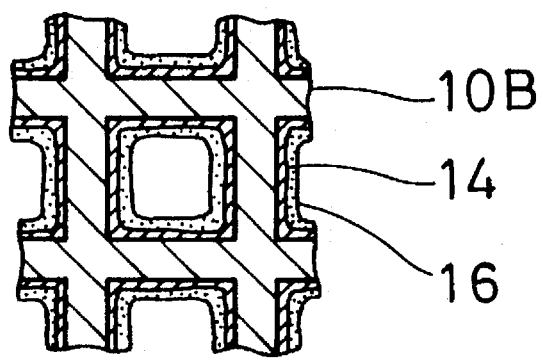
FIG. 2 is a magnified partial view in elevation of a catalyst-carrying electrically nonconductive support configured in a honeycomb structure of an exhaust gas catalytic purifier construction.

FIG. 2 is a view seen in the direction of exhaust gas flow of a catalytic converter carrier honeycomb-structured support in an exhaust gas catalytic purifier construction in a modification of the foregoing aspect. The carrier is a honeycomb molding 10B of carbon or ceramic. A bonding layer 14 and a catalyst layer 16, similar to their counterparts described above, are superficially formed on the molding 10B.

Figure 3:
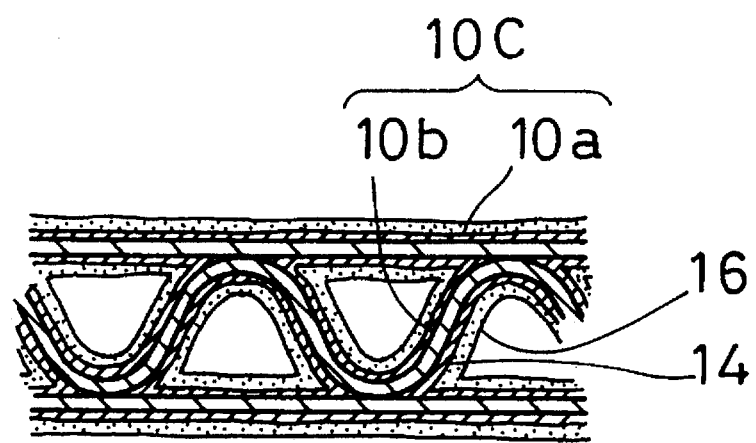
FIG. 3 is a magnified partial view in elevation of a catalyst-carrying metallic support configured in a honeycomb-laminar structure of an exhaust gas catalytic purifier construction.

FIG. 3 is a view seen in the direction of exhaust gas flow of a catalytic converter carrier honeycomb-laminar support in an exhaust gas catalytic purifier construction in a further modification of the foregoing. The catalyst carrier is a honeycomb metallic support 10C that is fabricated by laminating metallic flat sheets 10a and metallic corrugated sheets 10b alternately. A bonding layer 14 and a catalyst layer 16 similar to their counterparts just described are formed on the surface of the metallic carrier 10C. Alternatively, the honeycomb metallic carrier 10C is manufactured by stacking numerous sheets of given dimensions each consisting of a metallic flat sheet 10a and a metallic corrugated sheet 10b, or by spirally winding long sheets composed of the metallic flat sheet 10a and the metallic corrugated sheet 10b, respectively.

It is to be noted that the base material used in the present invention is not limited to the foregoing. It can also be a carrier consisting of a sheet or felt made of thin wires or carbon fibers (graphite), ceramic, or metal; a carrier made of a thin metal sheet, or a carrier made of a honeycomb, felty, or three-dimensional meshy (filter-like) integral molding of a ceramic. The three-dimensional meshy molding is desired in that it enables highly efficient purification of exhaust gas by the carried catalyst layer 16, since the fumes circulate among the numerous cells.

The bonding layer 14 can be formed by any one of thermal CVD methods (atmospheric-pressure CVD and low-pressure CVD), plasma-assisted CVD, photochemical vapor deposition, electron cyclotron resonance (ECR) plasma CVD, and other CVD processes. Thermal CVD is especially desirable because it has the following features: (1) the bonding layer can be formed on various kinds of metallic as well as non-metallic base material; (2) a bonding layer consisting of a predetermined multi-component alloy can be formed; (3) a bonding layer which has very excellent wear and abrasion resistance and excellent anticorrosion properties can be fabricated from TiC, SiC, BN, and other materials; (4) the bonding layer can be formed rapidly at a rate of several microns to hundreds of microns per minute; (5) since reactive gas during the CVD process can enter blind spots well, if the process is conducted at a relatively low pressure, then a bonding layer can be formed even inside thin, deep holes or other convolutions; (6) since a bonding layer of high purity can be formed at a relatively high temperature, a bonding layer having little internal distortion and few pinholes is realized, thus yielding excellent adhesion and elasticity characteristics; (7) it is not necessary to use a high voltage; (8) the machine is simple and a high vacuum is not necessary, therefore, productivity is high; and (9) it is easy to take preventative measures to prevent against hazards to the environment.

In the thermal CVD methods, low-pressure chemical vapor deposition is carried out in a reaction chamber evacuated to 0.1 to 10 torr. Compared with atmospheric-pressure CVD, low-pressure CVD has the following advantages: (1) the mean free paths of reactive gases and carrier gas and their diffusivities are increased, thus greatly improving the film thicknesses and the distribution of its specific resistivity, and reducing the amount of reactive gases consumed; (2) the reaction chamber takes the form of a diffusion furnace and, therefore, it is easy to control temperature; also the machine is simple in structure, hence reliability and throughput are improved greatly; and (3) less foreign substances adhere to the surface of the bonding layer.

Examples of thermal CVD methods include a method making use of a fluoride such as $WF_6$ or $MoF_6$, another making use of a chloride such as $WCl_6$ or $MoCl_6$, and one utilizing a carbide such as $W(CO)_6$ or $Mo(CO)_6$. The thin film condition of the bonding layer created by any one of these thermal CVD methods differs, depending on the reaction temperature (temperature of the processed substance) and on the concentration and flow rate of the raw material gases. A heatproof bonding layer having a large surface area can be obtained by appropriately selecting these conditions.

Figure 4:
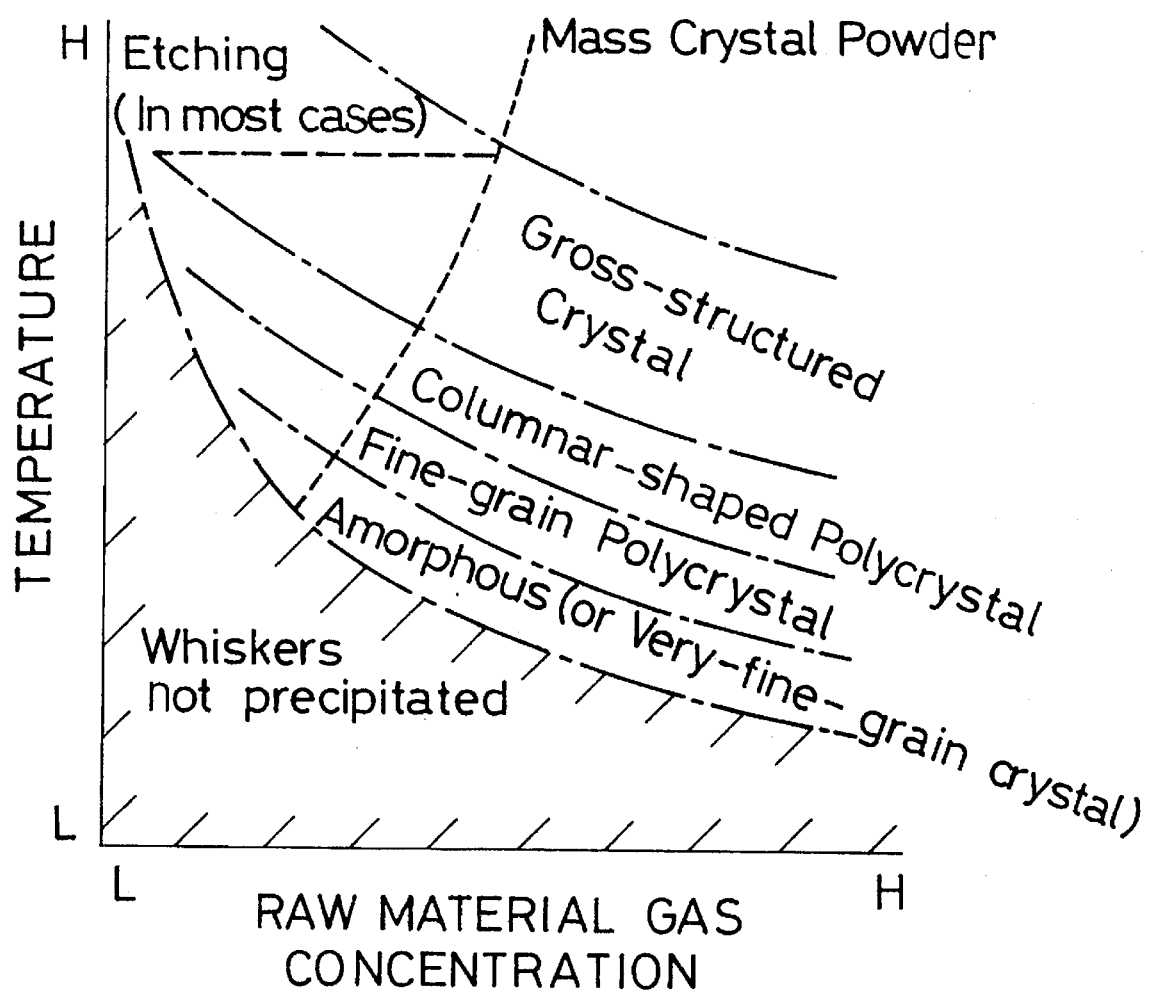
FIG. 4 is a graph illustrating morphological characteristics of substances deposited by the thermal chemical vapor deposition method used in the present invention for given parameters of reaction temperature and concentration of raw material gases.

FIG. 4 graphs characteristics illustrating the effects of the reaction temperature and the concentration of the raw material gases on the morphology of the deposited substance. It is necessary to set the reaction temperature and the concentration of the raw material gases in such a way that the deposited substance takes the form of a layer of gross-structured crystals or a film of columnar-shaped polycrystal. Preferably, the reaction temperature is in excess of 1000° C. for silicon carbide (SiC), in excess of 800° C. for alumina ($Al_2O_3$), and 600°–800° C. for molybdenum carbide ($Mo_2C$) and molybdenum silicide ($MoSi_x$).

The strength of the crystal obtained in the formation of the bonding layer 14 differs according to the kind of the base material. Wherein a bonding layer consisting of $W_xC$ having a thickness of 40 μm is formed on the surface of a base material made of 92% $Al_2O_3$, a tensile strength exceeding 10 kgf×mm$^{-2}$ is obtained. Wherein a bonding layer consisting of $W_xC$ having a thickness of 40 μm is formed on the surface of a base material made of a ferric stainless steel containing 20% by weight of Cr and 5% by weight of Al as principal constituents, the remaining part being Fe, a tensile strength exceeding 10 kgf×mm$^{-2}$ is obtained. Wherein sheets of the ferric stainless steel are coupled together by spot welding, the tensile strength is about 3 kgf×mm$^{-2}$. Wherein sheets of the ferric stainless steel are brazed together, the tensile strength is about 10 kgf×mm$^{-2}$. Therefore, the bonding layer 14 formed by CVD can be adopted in bonding together the metallic flat sheets 10a and the metallic corrugated sheets 10b of the metallic carrier 10C of the corresponding modification described earlier.

A specific example of method of fabricating an exhaust gas catalytic purifier construction according to foregoing aspects of the present invention will now be described.

First, "Foam Filter," manufactured by Toshiba Ceramics Co., Ltd. was prepared as a filter-like ceramic base material. The filter consists of $Al_2O_3$ and $ZrO_2$ and can withstand up to 1800° C. Its porosity is 80 to 90%. The filter is a disk-like form having a diameter of 80 mm and a thickness of 10 mm. The number of cells per inch was 8. A bonding layer 14 of WC was formed on the surfaces of the cells of the ceramic base material by a low-pressure thermal CVD method. Therein, processes were conducted at a reduced pressure of 500 mm Hg at a temperature of 650° C. $WF_6/C_6H_6/H_2$ gas was passed at flow rates of $0.3\times10^{-5}$ m$^3$/sec, $0.5\times10^{-5}$ m$^3$/sec, and $3\times10^{-5}$ m$^3$/sec, respectively, for 10 minutes. The surface area of the resulting bonding layer 14 formed on the base material was tens to hundreds of times that of the original base material.

Then, the upper surface of the bonding layer 14 was impregnated with porous alumina. The layer was dried and sintered to form a catalyst carrier layer consisting mainly of porous alumina. This catalyst carrier layer was made by competitive adsorption to carry catalytically active components (Pt/Pd/Rh). Subsequently, the layer was dried, sintered, and activated (or reduced), yielding catalyst layer 16 in finished form.

Figure 5A:
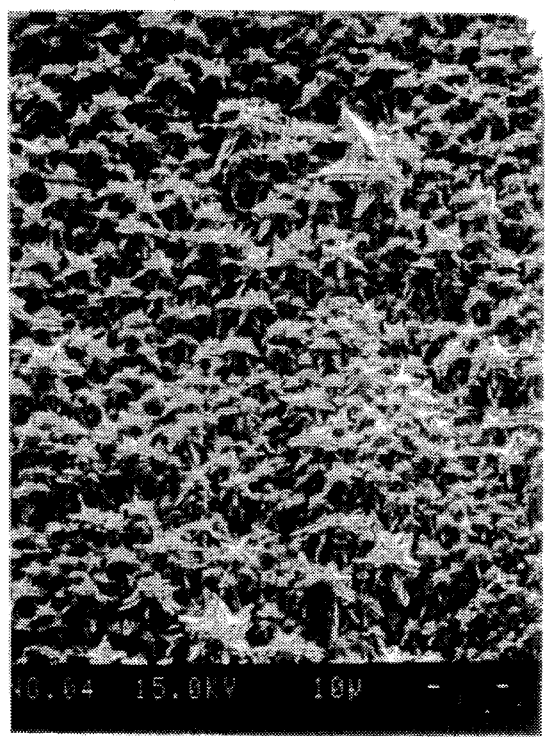
FIG. 5(a) is a micrograph showing surface structure of a gross-structured crystal layer of $W_xC$, in which the spacing between the hyphens in the lower right represents 10 μm.
Figure 5B:
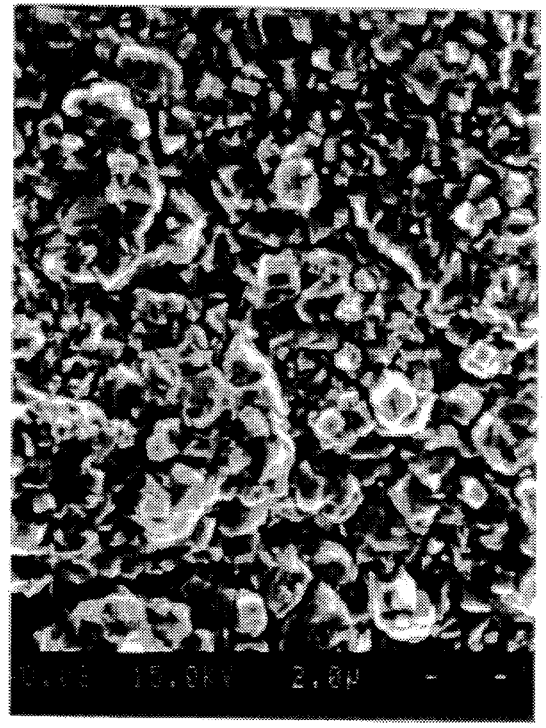
FIG. 5(b) is a micrograph showing surface structure of a columnar-shaped crystal layer of $W_xC$. in which the spacing between the hyphens in the lower right represents 2.0 μm.

FIG. 5(a) is a micrograph showing the surface structure of a gross-structured crystal layer having a thickness of 30 μm and made of $W_xC$ formed on a ferric stainless steel foil at a reduced pressure and a temperature of 650° C. FIG. 5(b) is a micrograph showing the surface structure of a columnar-shaped crystal layer having a thickness of 30 μm and made of $W_xC$ formed on a ceramic $Al_2O_3$ at a reduced pressure and a temperature of 800° C. The magnification of the micrograph of FIG. 5(a) is such that the spacing between hyphens appearing near the lower right end of the micrograph is 10 μm. The magnification of the micrograph of FIG. 5(b) is such that the spacing between hyphens appearing near the lower right end of the micrograph is 2.0 μm.

Preferred Embodiment

Figure 6:
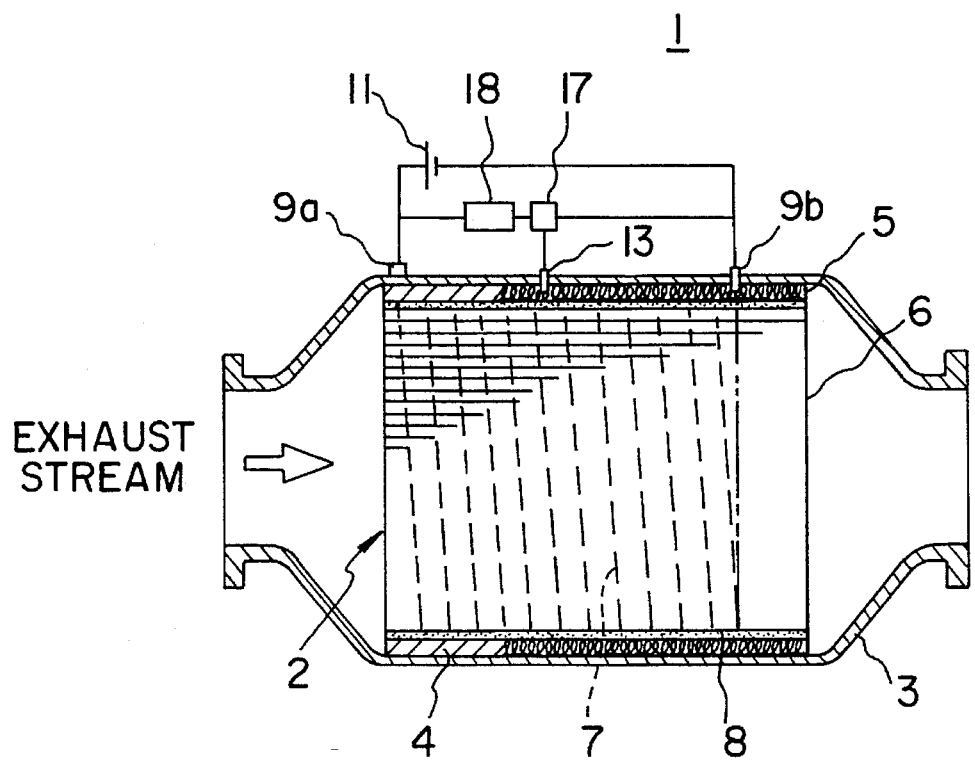
FIG. 6 is a schematic illustration of an exhaust gas catalytic purifier construction as an embodiment of the present invention.
Figure 7:
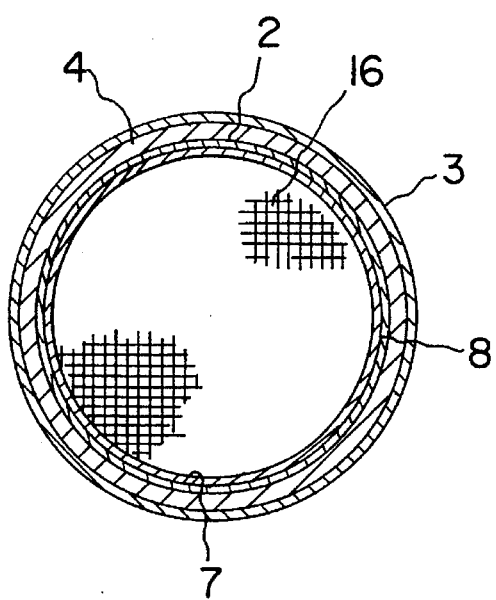
FIG. 7 is a cross sectional view corresponding to the embodiment as shown in FIG. 6.
Figure 8:
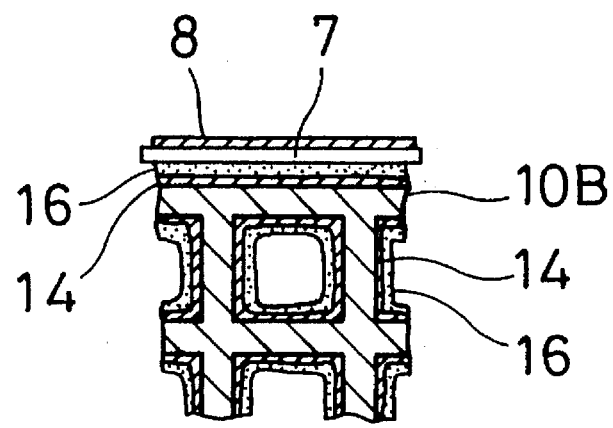
FIG. 8 is a magnified partial view corresponding to FIG. 7.
Figure 9:
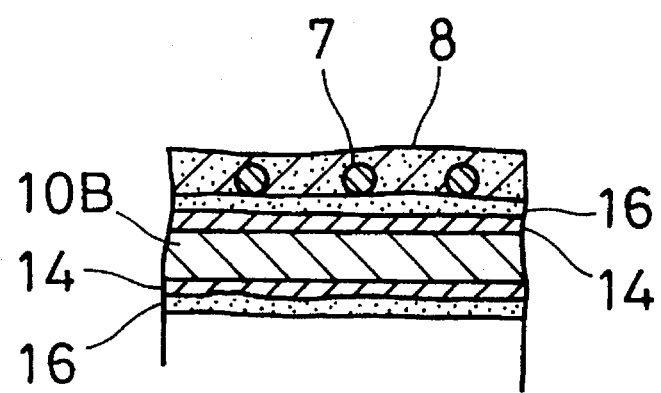
FIG. 9 is a partly in sectional view corresponding to FIG. 8.

An exhaust gas catalytic purifier construction 1 illustrated in FIG. 6, and as further illustrated cross-sectionally in installation in FIG. 7, according to the preferred embodiment of the present invention comprises a ceramic honeycomb-structured catalyst support 6 carrying a catalyst layer 16 (FIG. 2) via electrically conductive, low specific-heat bonding layer 14 (also FIG. 2), formed onto the ceramic carrier by chemical vapor deposition. An induction heating coil 7 is wound onto the ceramic catalyst support 6 peripherally; and as shown in FIGS. 8 and 9, a heat-resistant layer 8 of ceramic or other suitable material is spray-coated or fired on the catalyst support 6 to encompass it, composing a monolithic catalytic converter base construction 2.

The monolithic catalytic converter base construction 2 is mounted into a converter casing 3, circumferentially retained at its exhaust upstream end by a gastight seal 4, and additionally by a cushion 5 downstream thereof, which can be in the form of a wire netting, for example.

Catalyst heating current is electromagnetically induced in the bonding layer 14 via alternating magnetic flux from the induction heating coil 7, which is supplied a high-frequency current through electrodes 9a, 9b from high-frequency generator 18 and regulated by controller 17 in conjunction with temperature sensor 13. Power is supplied by motor vehicle ignition battery 11.

In the catalytic converter thus constructed and equipped, at engine start the induction coil 7 induces a current in the bonding layer 14, which being minimally thin and of low specific heat capacity, heats quickly at comparatively lower levels of current draw. Retaining the catalytically active component in the alumina layer with which it is impregnated, the bonding layer 14 in turn heats the catalyst quickly by thermal transfer. Hence the catalyst is heated at least partially, to effect catalytic conversion of "cold engine" exhaust noxious fumes including hydrocarbons and carbon monoxide, prior to warming otherwise by the "hot engine" exhausting gas upon warm-up to near normal operating temperature, i.e., until the temperature of gases entering the converter reaches about 300° C. At that point the temperature sensor 13, disposed in the monolithic catalytic converter base construction 2, cuts off the current supply to the induction heating coil 7, removing further load on the battery.

Figure 10:
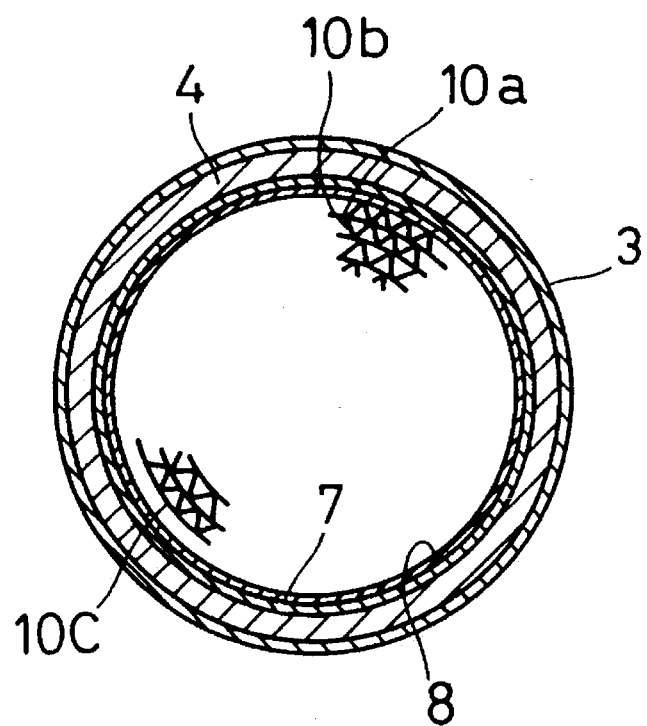
FIG. 10 is a cross sectional view of a modification of the embodiment illustrated in FIG. 6.

In a different version of the foregoing preferred embodiment of the present invention, as an alternative to the ceramic honeycomb-structured catalyst support 6, a metallic catalyst carrier, of for example either the wire mesh structure 10A as illustrated in FIG. 1, or the honeycomb of tiered flat and corrugated metal sheets 10C as in depicted in FIG. 3, and as further illustrated cross-sectionally in installation in FIG. 10, can be employed.

Figure 11:
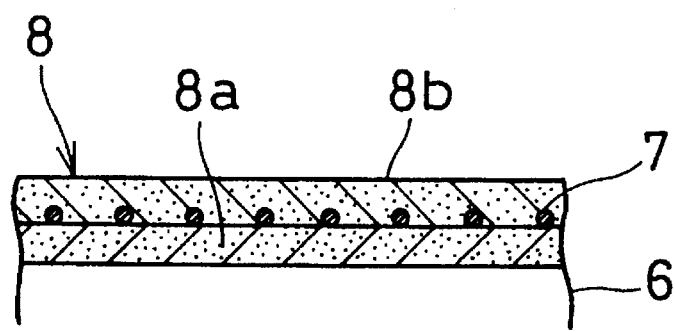
FIG. 11 is a partly in sectional view of the modification illustrated in FIG. 10.

In order to heat the catalyst therein, heating of the catalyst carrier 10A or 10C itself is induced via the induction heating coil 7, which peripherally surrounds the metallic support carrier, yet is separated from it an insulating layer 8. Wherein the metallic support is employed as the catalyst carrier in the exhaust gas catalytic purifier construction 1, as shown in FIG. 11, the insulating layer 8 comprises two sections, viz. electrical/thermal insulating layer 8a, and induction heating coil 7 heat-resistant fixing layer 8b containing the induction heating coil 7. In this case, the induction coil 7 is not wound directly onto the metallic support 10A/10C.

Enveloping the ceramic catalyst support 6 of the preferred embodiment by the electrical/thermal insulating layer 8a further improves performance and reliability characteristics of the exhaust gas catalytic purifier construction 1.

Alternative Embodiments

Figure 12:
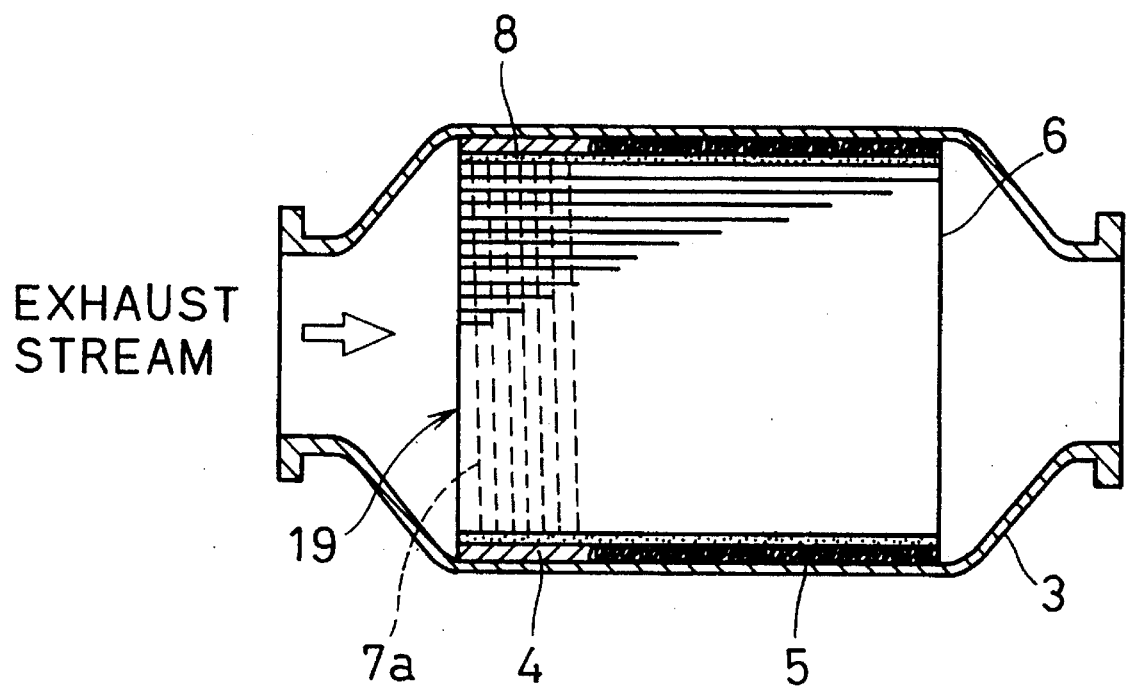
FIG. 12 is a schematic illustration of an exhaust gas catalytic purifier construction in another embodiment of the present invention.

Induction heating of an exhaust gas catalytic purifier construction 1 embodying the invention in a further aspect can be partial only, for example, concentrated at the exhaust upstream end of the construction as embodied in a catalytic converter. An example is represented in FIG. 12, wherein induction heating coiling 7a is closely wound onto the gastight seal 4 end of the monolithic catalytic converter base construction 19.

Figure 13:
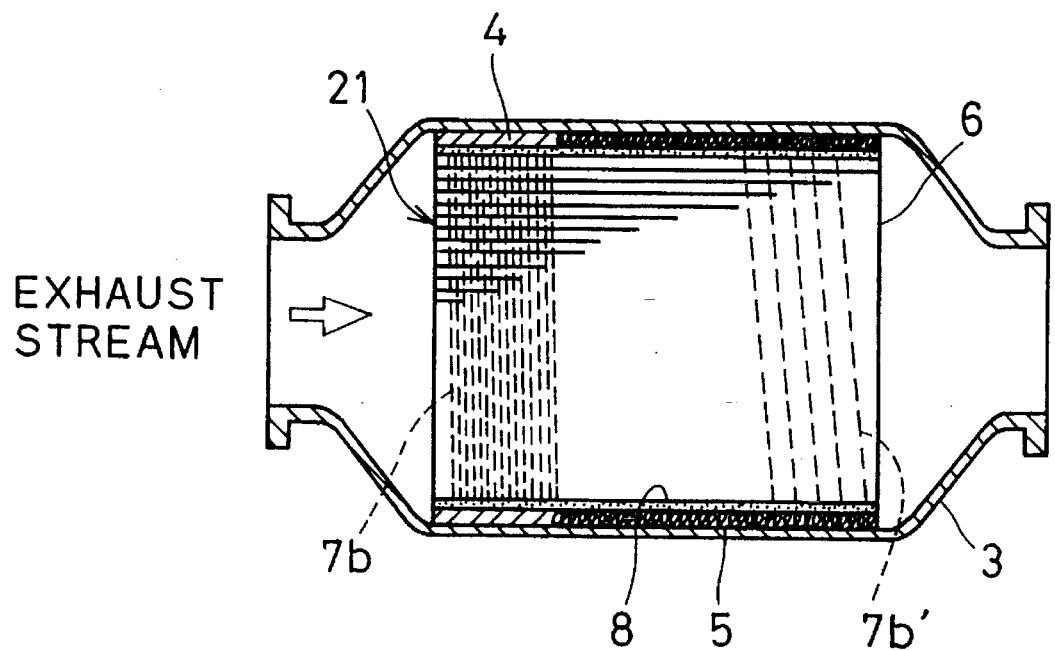
FIG. 13 is a schematic illustration of an exhaust gas catalytic purifier construction in a modification of the embodiment.
Figure 14:
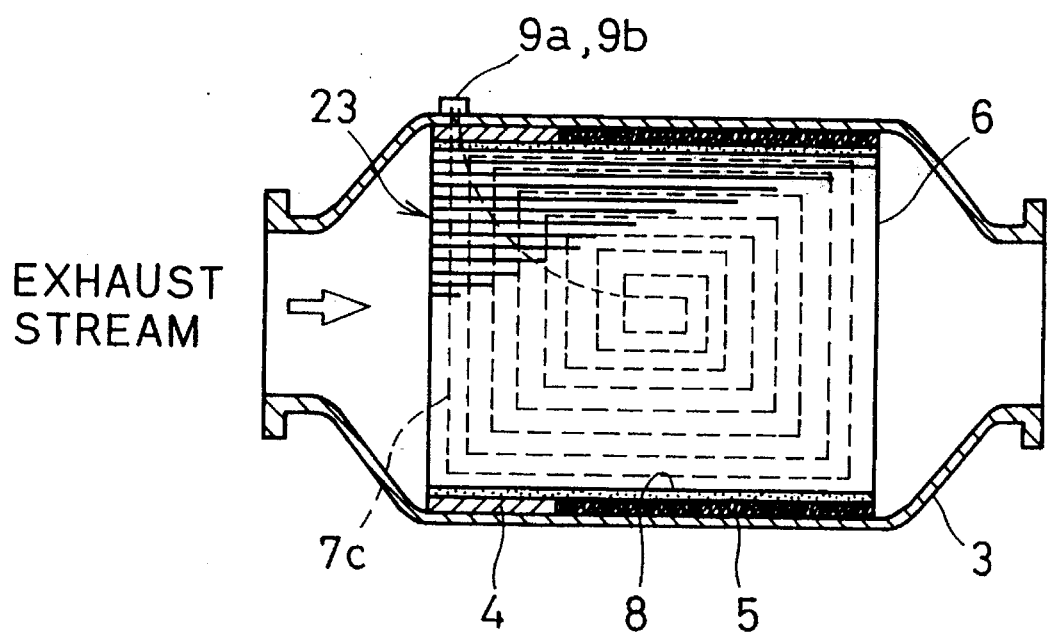
FIG. 14 is a schematic illustration of an exhaust gas catalytic purifier construction in a further modification of the embodiment.
Figure 15:
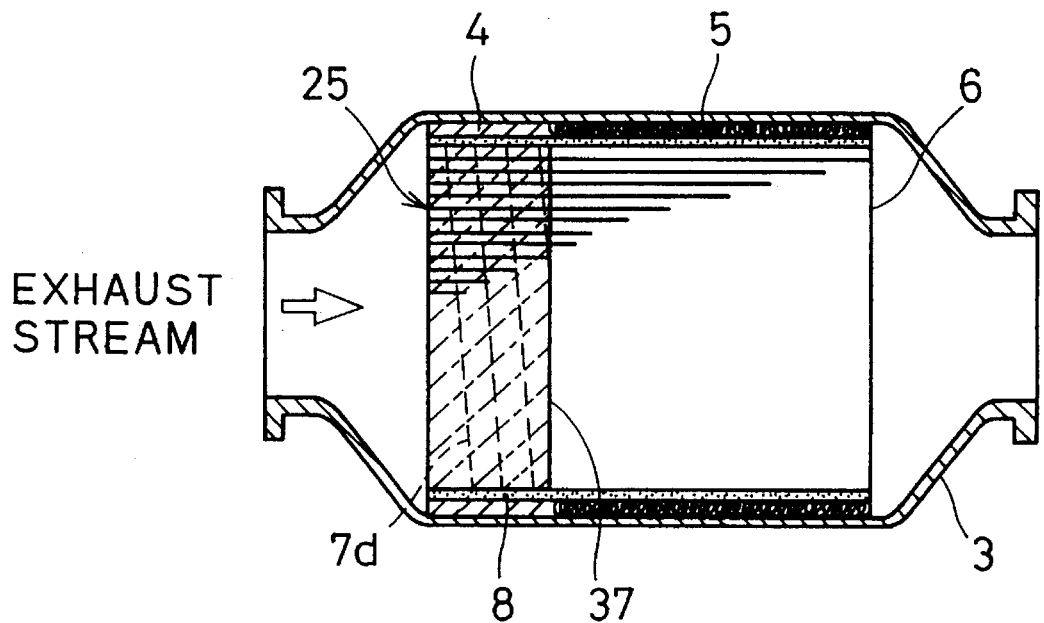
FIG. 15 is a schematic illustration of an exhaust gas catalytic purifier construction as a further embodiment of the present invention.

Indeed, it is to be understood that this invention covers any and all manner of winding on the induction heating coiling, as illustrated in further examples by FIGS. 13 and 14, which may be chosen to elect heating to suit dimensional requirements. In the embodiment represented by FIG. 13, close-wound coiling 7b about monolithic catalytic converter base construction 21 provides concentrated inductive catalytic heating at the exhaust upstream end, while at the opposite end, widely-spaced partial coiling 7b' can provide latter-stage heating, balancing improved efficiency. In an alternative to concentric circumferential winding, FIG. 14 illustrates spiral winding 7c effective of inductive catalytic heating about monolithic catalytic converter base construction 23, as well the consequent manner of connection to electrodes 9a, 9b.

Wherein the bonding layer 14 is non-conductive, or is not itself to be heated, a conductive layer 37 as shown in FIG. 15 having designated resistance may be formed on catalytic heating sub-portion 25, which therein can comprise the ceramic support as catalyst carrier 6 of the monolithic catalytic converter base construction 2. The conductive layer can be heated by the direct application of electric current; inductive heating can be achieved via coiling 7d having relatively fewer turns on insulating layer 8.

Figure 16:
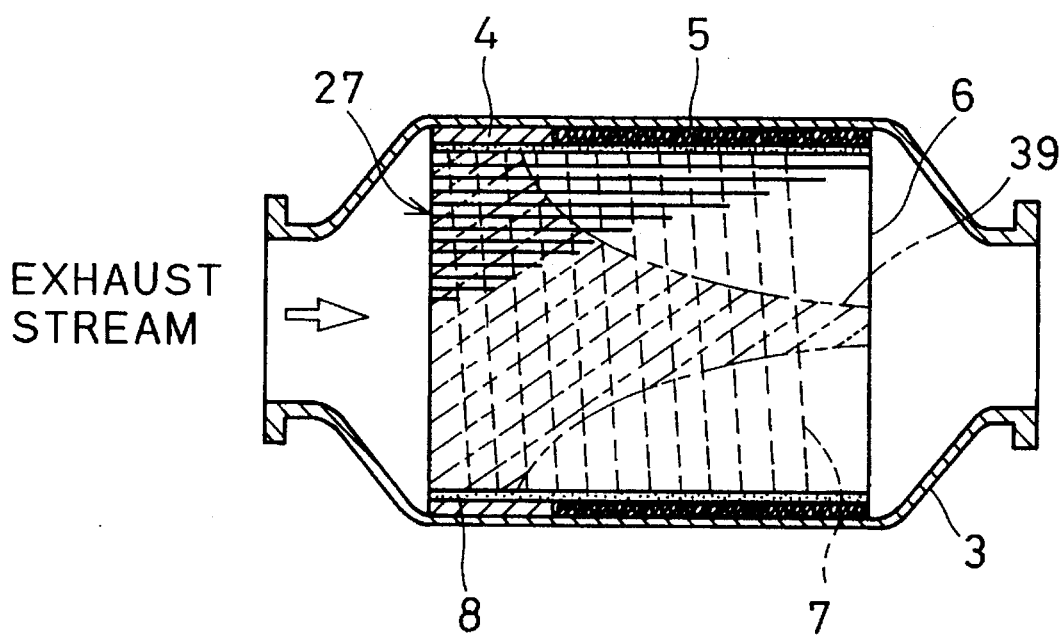
FIG. 16 is a schematic illustration of an exhaust gas catalytic purifier construction in a modification of the embodiment illustrated in FIG. 15.

FIG. 16 shows a patterning of the conductive layer, indicated as 39 and forming catalytic heating sub-portion 27, analogous in heating effect to the coiling configuration illustrated in FIG. 13. In the construction of FIG. 16, induction heating coiling 7 is wound around monolithic catalytic converter base construction 2 in the same pattern as illustrated in FIG. 6 for the preferred embodiment, to effect an efficient gradient of heating with respect to the exhaust gas stream as it enters the converter housing 3.

Figure 17:
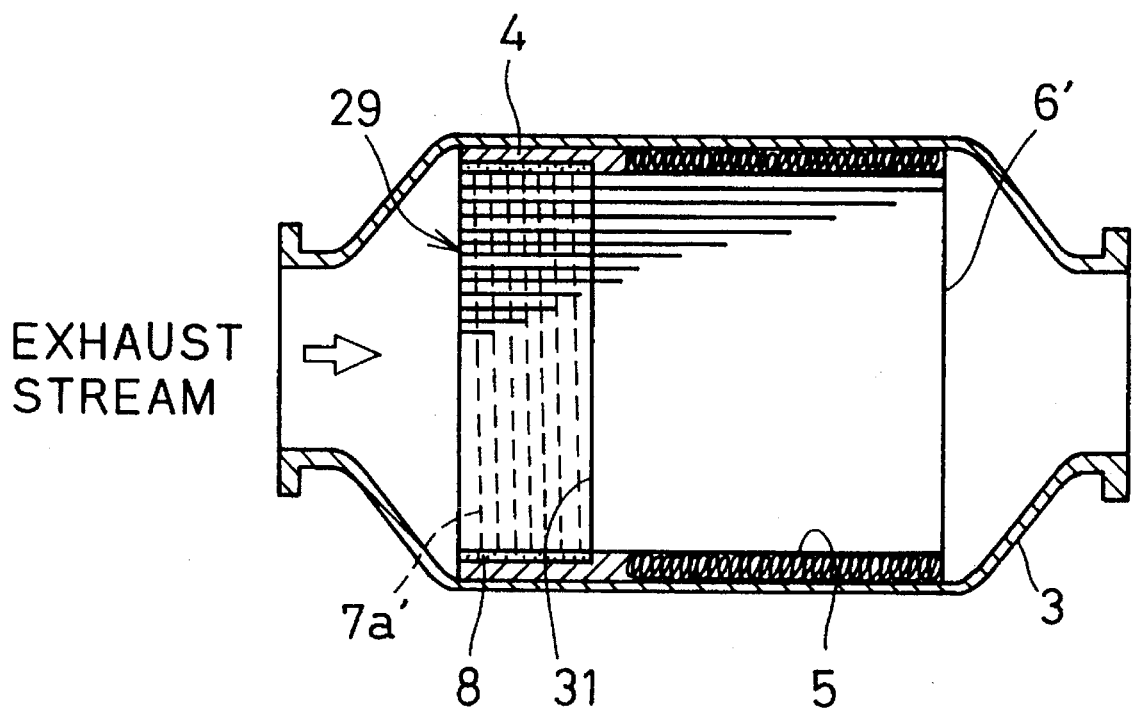
FIG. 17 is a schematic illustration of an exhaust gas catalytic purifier construction in yet another embodiment of the present invention.

The monolithic catalytic converter base construction can be divided into distinct main portion 6' and inductively heating sub portion 29, as shown in FIG. 17. The main portion 6' comprises the ceramic honeycomb-structured catalyst carrier to which catalyst can be adhered via the CVD-deposited bonding layer; and the sub-portion 29 comprises a metallic support 31, carrying catalyst either via the CVD-deposited bonding layer or by conventional means. In this case, no conductive layer is necessary, since the metallic support 31 is heated inductively by the basic-patterned induction heating coil 7a'. The metallic support 31 as embodied in catalyst-carrying sub-portion 29 can also be heated by energizing it directly.

Further Embodiments

Additional examples embodying further aspects of the present invention, in which an exhaust gas catalytic purifier construction is formed from catalyst carrier onto which a catalyst bonding layer is formed by chemical vapor deposition are described henceforth. In these cases the catalyst adhered to the bonding layer is heated by the direct application of electrical energy.

Figure 18:
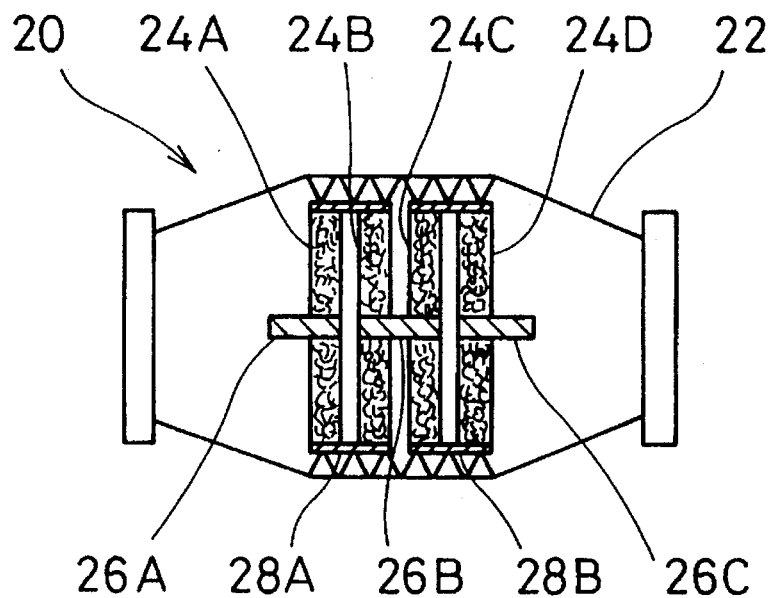
FIG. 18(a) is a schematic elevational view illustrating a preheating-type catalytic converter as a still further embodiment of the invention.
FIG. 18(b) is a vertical cross section corresponding to FIG. 18(a)
Figure 18:
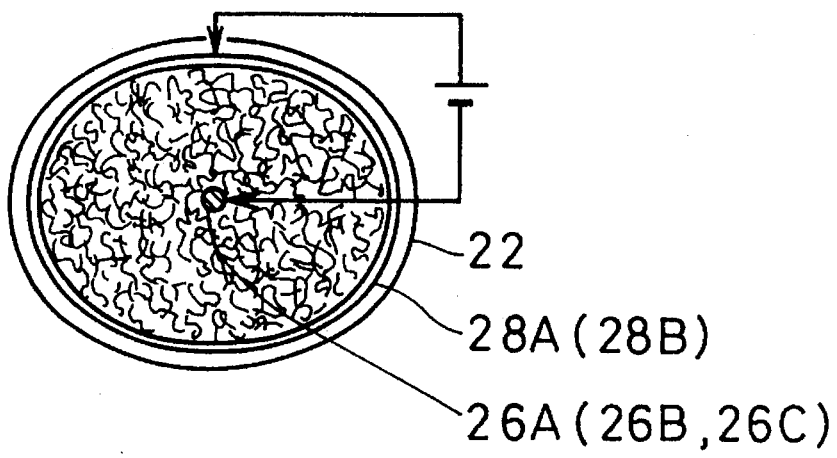

FIG. 18(a) is a side elevation in vertical cross section of a preheating-type catalytic converter according to a further example of the invention. FIG. 18(b) is a front elevation in vertical cross section of this preheating-type catalytic converter.

As shown, the preheating-type catalytic converter, indicated by 20, has a casing 22 in which disk-like first, second, third, and fourth catalytic filters 24A, 24B, 24C, and 24D are spaced from each other in the direction in which exhaust gas is circulated. Each filter comprises a spongy ceramic carrier and is formed essentially as described above for the preferred embodiment. A first central electrode 26A acting as an external connector terminal is inserted in the first catalytic filter 24A. The first catalytic filter 24A and the second catalytic filter 24B are connected together by a first outer electrode 28A. The second catalytic filter 24B and the third catalytic filter 24C are connected together by a second central electrode 26B. The third catalytic filter 24C and the fourth catalytic filter 24D are connected together by a second outer electrode 28B. A third central electrode 26C serving as an external connector terminal is inserted in the fourth catalytic filter 24D. An energizing means (not shown) is mounted between the first central electrode 26A and the third central electrode 26C. A potential difference is developed between the center and the outer periphery of each of the catalytic filters 24A–24D, so that electrical current flows through the bonding layers of the filters 24A–24D. As a result, the catalyst layer is heated to a high temperature.

Figure 19:
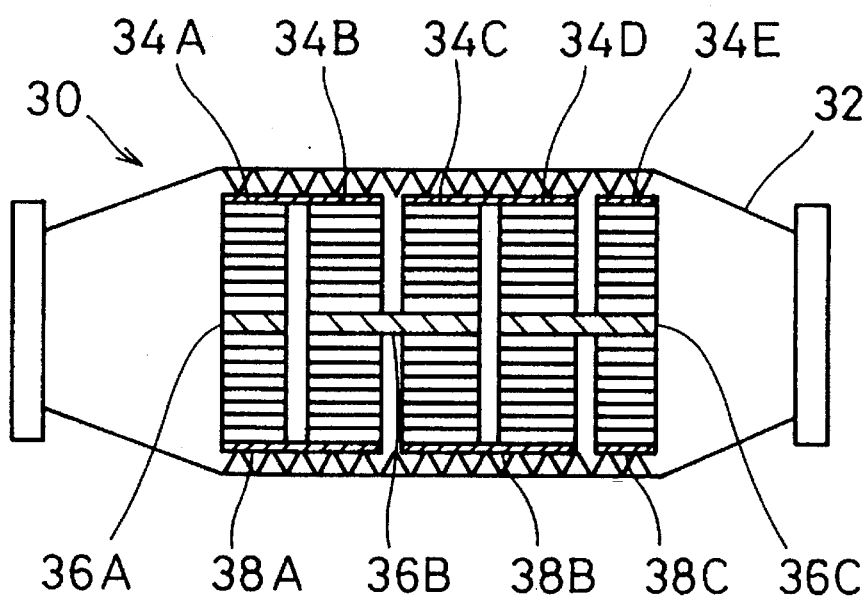
FIG. 19(a) is a schematic elevational view illustrating a preheating-type catalytic converter in a modification of the embodiment illustrated in FIGS. 18(a) and (b)
FIG. 19(b) is a vertical cross section corresponding to FIG. 19(a)
Figure 19:
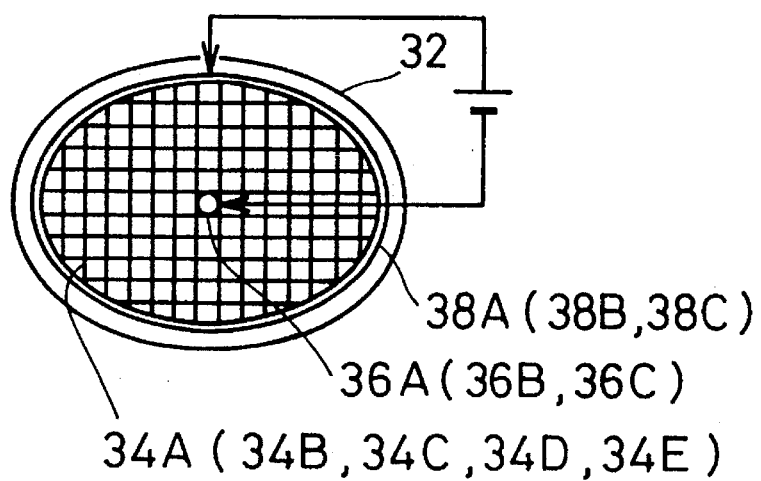

FIG. 19(a) is a side elevation in vertical cross section of a preheating-type catalytic converter forming a first modification of the foregoing example. FIG. 19(b) is a front elevation in vertical cross section of this preheating-type catalytic converter.

As shown in these figures, the preheating-type catalytic converter, Indicated by numeral 30, has a casing 32 in which disk-like first, second, third, fourth, and fifth catalytic filters 34A, 34B, 34C, 34D, and 34E, respectively, are spaced from each other in the direction in which exhaust gas is circulated. Each filter is a honeycomb ceramic carrier fabricated from carbon or a silicon carbide composite by the method described earlier. A first central electrode 36A acting as an external connector terminal is inserted in the first catalytic filter 34A. The second catalytic filter 34B and the third catalytic filter 34C are connected together by a second central electrode 36B. The fourth catalytic filter 34D and the fifth catalytic filter 34E are connected together by a third central electrode 36C. The first catalytic filter 34A and the second catalytic filter 34B are connected together by a first outer electrode 38A. The third catalytic filter 34C and the fourth catalytic filter 34D are connected together by a second outer electrode 38B. A third outer electrode 38C acting as an external connector terminal is inserted in the fifth catalytic filter 34E. In this preheating-type catalytic converter 30, the base material and the bonding layer of the carbide cooperate to form an electrical resistor. An energizing means (not shown) is mounted between the first central electrode 36A and the third outer electrode 38C. Thus, an electrical potential is produced between the center and the outer periphery of each of the catalytic filters 34A–34E.

Figure 20:
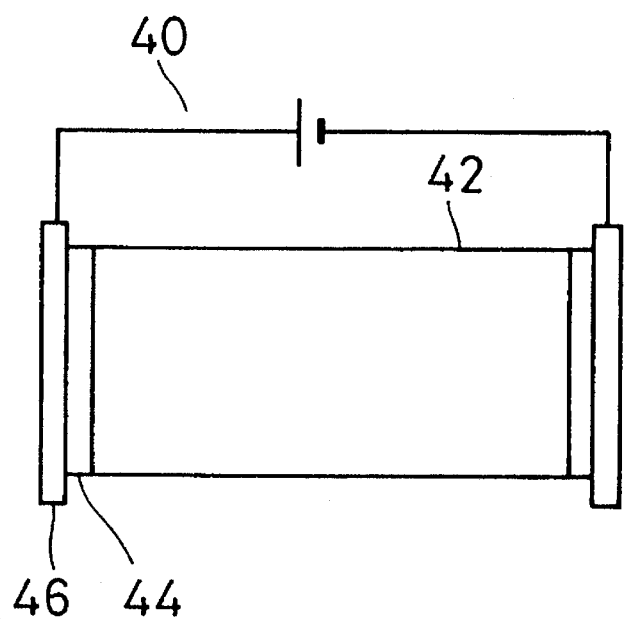
FIG. 20(a) is a schematic elevational view illustrating a preheating-type catalytic converter in a further modification of the embodiment.
FIG. 20(b) is a cross sectional view corresponding to FIG. 20(a)
Figure 20:
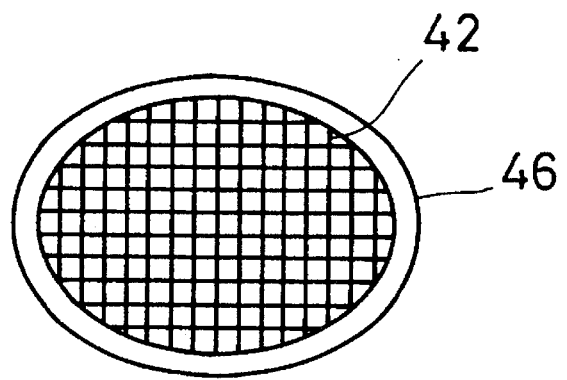

FIG. 20(a) shows the structure of the lateral surface of a preheating-type catalytic converter forming a second modification of the example as above. FIG. 20(b) is a front elevation in vertical cross section of the preheating-type catalytic converter.

The base material of the preheating-type catalytic converter 40 comprises a ceramic honeycomb structure 42 molded out of cordierite. Bonding layers are formed at both ends of the inside and at both ends of the outside of the honeycomb structure 42. That is bonding layers are formed on the inside of the honeycomb structure both on the inside and the outside of the honeycomb channels. In this case, the outer bonding layers 44 are made thicker than the inner bonding layers to reduce the electrical resistance of the outer bonding layers 44. Also shown are external connector terminals 46 formed on the surfaces of the outer bonding layers 44.

Figure 21A:
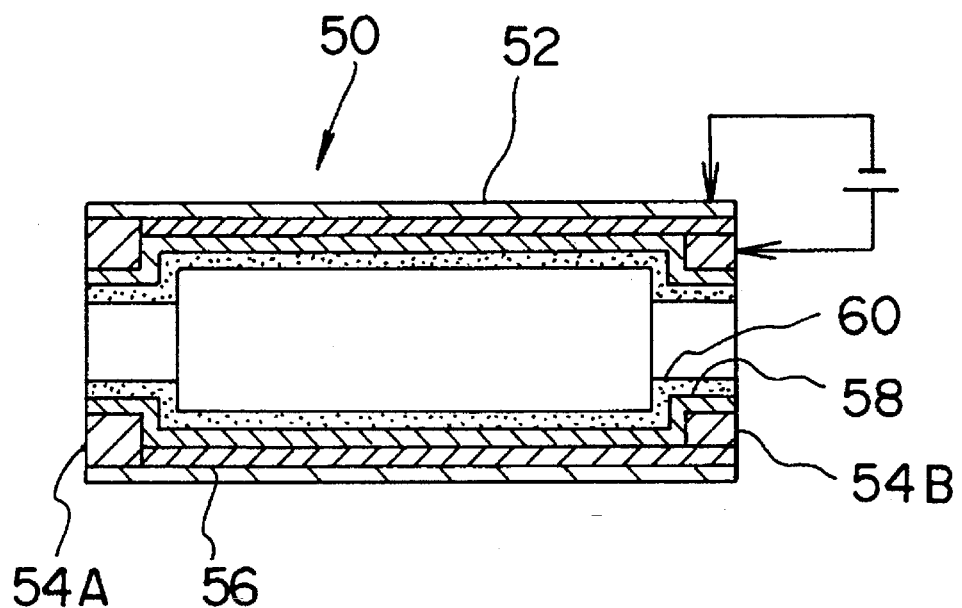
FIG. 21(a) is a schematic view of an engine exhaust conduit in yet a further embodiment of the invention.
Figure 21B:
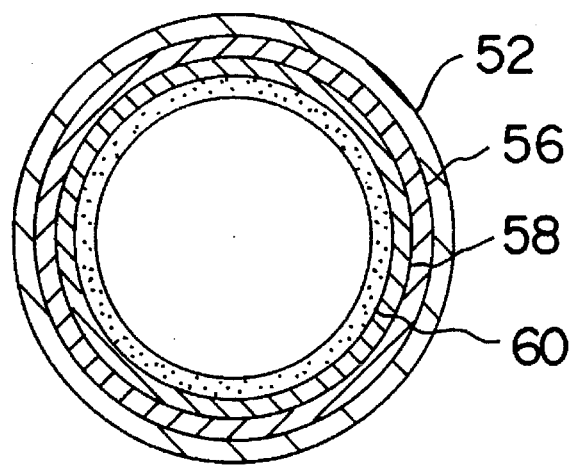
FIG. 21(b) is a cross sectional view corresponding to FIG. 21(a).

FIG. 21(a) is a side elevation in vertical cross section of an engine exhaust pipe as an example of the invention embodied in an exhaust system component other than the catalytic converter. FIG. 21(b) is a front elevation in vertical cross section of the preheating-type catalytic converting-equipped exhaust conduit.

As shown, the engine exhaust pipe, indicated by numeral 50, is made of a metallic tube 52. A first annular electrode 54A is welded to the inner surface at one end (the left end in the figures) of the tube 52. An insulating film 56 having a thickness of about 100 μm is formed from $Al_2O_3$ by CVD over the whole inner surface of the tube 52 except for one end. A second annular electrode 54B is mounted on the inner side of the insulating film 56 at the other end of the tube 52. Bonding layers 58 are formed on the inner surfaces of the first and second electrodes 54A and 54B and of the insulating film 56 by CVD. A catalyst layer 60 is formed on the inner surface of each bonding layer 58. An energizing means is mounted between the outer surface at the other end of the tube 52 and the second electrode 54B. When an electrical current is passed between opposite ends of each bonding layer 58, the catalyst layer 60 is heated to a high temperature.

As described in the foregoing, a catalyst bonding layer is formed on the surface of a base material by chemical vapor deposition in an exhaust gas catalytic purifier construction. The bonding layer is formed as a ceramic of columnar-shaped or gross-structured crystals or of an intermetallic compound, and thus it has a suitably rough surface to bond the catalyst material. The bonding layer moreover can be superficially formed on the base material easily and rapidly. In consequence, the production efficiency is enhanced.

Since the bonding layer is formed by CVD, the layer is made uniform. Also, the bonding layer can be formed irrespective of the shape of the base material. Therefore, a bonding layer having a rough surface can be formed uniformly even on a base material the shape of which would otherwise make it difficult to form a bonding layer, or which shape may be so complex that a uniform bonding layer would be impracticable to form by conventional techniques.

In other embodiments of the exhaust gas catalytic purifier construction wherein the bonding layer serves as an electric resistor and is electrically energized, it is quickly heated to a high temperature with a small amount of electric power. Consequently, the catalyst layer quickly reaches a temperature suitable for a purification reaction. For this reason, the burden imposed on the battery during ignition of the engine is alleviated.

Wherein the bonding layer is formed of at least one carbide selected from the group consisting of tungsten carbide, molybdenum carbide, silicon carbide and alloys thereof, or from at least one silicide selected from the group consisting of tungsten silicide, molybdenum silicide, tantalum silicide, titanium silicide and alloys thereof, CVD can be effected at a any given temperature within a range from a relatively low to a relatively high temperature. This permits formation of a bonding layer on a metallic exhaust pipe or on a metallic carrier without distortion, it being noted that such a metallic exhaust pipe and metallic carrier tend to deform easily at high temperatures.

In the method of fabricating an exhaust gas catalytic purifier construction wherein metallic flat and corrugated sheets are alternately laminated to form a tiered honeycomb catalyst carrier, and subsequently a bonding layer is formed superficially thereon by CVD from a ceramic as in the foregoing, the bonding layer bonds the metallic flat sheets and the metallic corrugated sheets together, such that in addition to the advantages likewise as above, spot welding, brazing, or any other similar method which would have been needed heretofore to bond the metallic flat sheets and corrugated sheets together is dispensed with.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A combination comprising:

a source of exhaust gas containing noxious fumes;

an exhaust gas catalytic purifier operatively associated with said source of said exhaust gas comprising:
  a housing containing:
    a catalyst carrier;
    a substantially uniform, electrically energizable bonding layer, in at least one form selected from the group consisting of a layer of gross structural crystals, a film of columnar shaped crystals, and an intermetallic compound,
  wherein said bonding layer has been formed by chemical vapor deposition on said catalyst carrier,
  wherein said bonding layer is supported by said catalyst carrier,
  wherein said bonding layer has a heat capacity sufficient to generate heat upon being energized,
  wherein said bonding layer has a substantially uniformly formed, sufficiently rough surface to firmly bond a catalyst layer thereto,
  wherein said bonding layer comprises:
    at least one carbide selected from the group consisting of tungsten carbide, molybdenum carbide, silicon carbide, and carbides of alloys of said metals, or
    at least one silicide selected from the group consisting of tungsten silicide, molybdenum silicide, tantalum silicide, titanium silicide, and silicides of alloys of said metals; and
  a catalyst layer disposed on and firmly bonded to said rough surface of said bonding layer disposed away from said catalyst carrier and supported by said catalyst carrier;
means to energize said bonding layer which electromagnetic induction means comprising:
  coil means disposed on a peripheral portion of said catalyst carrier, and
  high frequency generator means in operative contact with said coil means;
wherein said generator is sufficient to supply a current to said coil means of a frequency high enough to energize said bonding layer;
wherein said electromagnetic induction means is sufficient to generate heat which is sufficient to heat said catalyst to an operating temperature sufficient to cause the conversion of said noxious fumes and to thereby convert noxious fumes in said exhaust gas;
means to introduce said exhaust gas into operative association with said catalyst layer which has been heated by said energized bonding layer; and
means to remove catalytically converted exhaust gas, containing less of said noxious fumes, from said purifier.

2. The combination as claimed in claim 1 wherein said catalyst carrier comprises a filter lattice comprising carbon.

3. The combination as claimed in claim 1 wherein said catalyst carrier comprises a filter lattice comprising ceramic.

4. The combination as claimed in claim 2 wherein said filter lattice comprises a honeycomb filter lattice.

5. The combination as claimed in claim 3 wherein said filter lattice comprises a honeycomb filter lattice.

6. The combination as claimed in claim 1 wherein said catalyst carrier comprises a filter lattice comprising metallic fibers.

7. The combination as claimed in claim 1 wherein said catalyst carrier comprises a filter mesh comprising metallic fibers.

8. The combination as claimed in claim 1 wherein said catalyst carrier comprises a filter honeycomb metallic structure.

9. The combination as claimed in claim 1 wherein said bonding layer comprises a film of columnar structured ceramic crystals, which film has a rough surface bonded to said catalyst layer.

10. The combination as claimed in claim 1 wherein said bonding layer comprises a layer of gross structured ceramic crystals, which layer has a rough surface bonded to said catalyst layer.

11. The combination as claimed in claim 1 wherein said bonding layer comprises an intermetallic compound which has a rough surface bonded to said catalyst layer.

12. The combination comprising:

a source of exhaust gas containing noxious components; and an exhaust gas catalytic purifier comprising:
  a metallic exhaust gas conduit, comprising an inside wall and an outside wall, which conduit contains:
    a substantially uniform, electrically energizable bonding layer in at least one form selected from the group consisting of a layer of gross structural crystals, a film of columnar shaped crystals, and an intermetallic compound,
  which bonding layer has been formed by chemical vapor deposition on said inside wall of said conduit,
  which bonding layer is supported by said inside wall of said conduit,
  wherein said bonding layer has a heat capacity sufficient to generate heat upon being energized,
  wherein said bonding layer has a substantially uniformly formed, sufficiently rough surface to firmly bond a catalyst layer thereto,
  wherein said bonding layer comprises:
    at least one carbide selected from the group consisting of tungsten carbide, molybdenum carbide, silicon carbide, and carbides of alloys of said metals, or
    at least one silicide selected from the group consisting of tungsten silicide, molybdenum silicide, tantalum silicide, titanium silicide, and silicides of alloys of said metals;
  a catalyst layer disposed on and firmly bonded to said rough surface of said bonding layer directed away from said conduit;
means to energize said bonding layer which comprises electromagnetic induction means comprising:
  coil means disposed on a peripheral portion of said catalyst carrier, and
  high frequency generator means in operative contact with said coil means;
wherein said generator is sufficient to supply a current to said coil means of a frequency high enough to energize said bonding layer to an extent sufficient to generate heat which is sufficient to heat said catalyst to an operating temperature sufficient to cause the conversion of said noxious fumes and to thereby convert noxious fumes in said exhaust gas;
means to introduce said exhaust gas containing noxious components into said metallic gas conduit;
means to contact said noxious fumes with said catalyst layer heated by said energized bonding layer under conditions sufficient to convert noxious fumes; and means to remove exhaust gas, containing a smaller proportion of noxious fumes, from said purifier.

13. The combination as claimed in claim 12 further comprising an electrically and thermally insulating layer, formed by chemical vapor deposition, disposed between said conduit and said bonding layer.

14. The combination of;

a source of exhaust gas containing noxious fumes;

an exhaust gas passage having an inside surface, operatively associated with said source so as to pass said exhaust gas therethrough;

an exhaust gas catalytic purifier disposed within said exhaust gas passage comprising:
an electromagnetic induction heating coil means disposed inwardly of said exhaust gas passage disposed on said inside surface of said passage;

a heat conductive means disposed on an inwardly directed portion of said electromagnetic induction heating coil means in heatable relation to said induction coil heating means disposed in said exhaust gas passage; and exhaust gas conversion catalyst inwardly disposed on and carried by said heat conductive means so positioned as to be heatable by said heat conductive means and in operative contact with noxious fumes in exhaust gas passing through said passage;

wherein said induction heating coil means is disposed in sufficiently close proximity to said conductive means to cause current to pass through said conductive means via electromagnetic induction in an amount sufficient to cause said conductive means to become heated and to thereby heat said catalyst;

a ceramic support lattice disposed on said inside surface of said exhaust gas passage in supporting relation to said induction heating coil means;

wherein said conductive means comprises a substantially uniform, electrically energizable rough bonding layer in at least one form selected from the group consisting of a layer of gross structural crystals, a film of columnar shaped crystals, and an intermetallic compound;

wherein said bonding layer has been formed by chemical vapor deposition;

wherein said bonding layer has been formed onto and is bonded to said ceramic support lattice;

wherein said bonding layer comprises:
at least one carbide selected from the group consisting of tungsten carbide, molybdenum carbide, silicon carbide, and carbides of alloys of said metals, or
at least one silicide selected from the group consisting of tungsten silicide, molybdenum silicide, tantalum silicide, titanium silicide, and silicides of alloys of said metals;

wherein said catalyst is disposed on and is bonded to said bonding layer; and a generator sufficient to supply current to said induction heating coil of sufficient frequency and magnitude to cause said induction heating coil to produce an alternating magnetic flux of sufficient magnitude to cause current to flow in said conductive means in an amount sufficient to generate sufficient heat to heat said catalyst to a temperature at which said catalyst is operative to catalyze conversion of noxious fumes in said exhaust gas.

15. The combination as claimed in claim 14 further comprising heat resistant means securing said induction heating coil means to said conductive means.

16. The combination as claimed in claim 15 wherein said securing means comprises spray coated ceramic.

17. The combination as claimed in claim 14 further comprising temperature sensor means, in measuring association with said catalyst to measure the temperature of said catalyst, and means to control the amount of said current supplied to said induction heating coil means responsive to a temperature sensed by said temperature sensor means, whereby controlling the temperature of said catalyst.

18. The combination as claimed in claim 14 wherein said catalyst and conductive means are divided into a downstream main portion and an upstream sub-portion, said sub-portion disposed between said main portion and said source of exhaust gas; and wherein said induction heating coil mean is operatively associated with said upstream sub-portion of said catalyst and conductive means.

19. The combination as claimed in claim 14 wherein said bonding layer is an electromagnetically conductive layer which is heatable through electromagnetic induction from said induction heating coil means.

20. The combination of;

a source of exhaust gas containing noxious fumes;

an exhaust gas passage having an inside surface, configured to pass said exhaust gas therethrough;

an exhaust gas catalytic purifier inside said exhaust gas passage comprising:
an electrically non-conductive support;
an electrically conductive means; and
an exhaust gas conversion catalyst;

an electromagnetic induction coil means disposed on an inside surface of said exhaust gas passageway in sufficiently close proximity to said electrically conductive means to cause current to pass through said electrically conductive means via electromagnetic induction in an amount sufficient to cause said electrically conductive means become heated and to thereby heat said catalyst to a conversion temperature, said electrically non-conductive support is disposed on an inside surface of said coil, said electrically conductive means is disposed on an inside surface of said electrically non-conductive support, wherein said catalyst is disposed on and carried by an inside surface of said electrically conductive means and is in sufficiently close proximity to said electrically conductive means to be heated by said electrically conductive means;

wherein said conductive means comprises a substantially uniform, electrically energizable rough bonding layer in at least one form selected from the group consisting of a layer of gross structural crystals, a film of columnar shaped crystals, and an intermetallic compound;

wherein said bonding layer has been formed by chemical vapor deposition;

wherein said bonding layer has been formed onto and is bonded to said electrically non-conductive support;

wherein said bonding layer comprises:
at least one carbide selected from the group consisting of tungsten carbide, molybdenum carbide, silicon carbide, and carbides of alloys of said metals, or at least one silicide selected from the group consisting of tungsten silicide, molybdenum silicide, tantalum silicide, titanium silicide, and silicides of alloys of said metals;

wherein said catalyst is disposed on and is bonded to said bonding layer; and generator means sufficient to supply current to said induction coil of sufficient frequency and magnitude to cause said induction coil to produce an alternating magnetic flux of sufficient magnitude to cause current to flow in said electrically conductive means in an amount sufficient to generate sufficient heat to heat said catalyst to a temperature at which said catalyst is operative to catalyze conversion of noxious fumes in said exhaust gas.

21. The combination as claimed in claim 20 wherein said electrically non-conductive support comprises an electrically and thermally insulating layer.

22. The combination as claimed in claim 20 wherein said electrically non-conductive support is a ceramic support lattice, said electrically conductive means is in partial contact with said ceramic support lattice. and wherein the resistance of said electrically conductive layer is determined by the amount of said contact.

* * * * *